United States Patent
Wu et al.

(10) Patent No.: US 12,462,046 B2
(45) Date of Patent: Nov. 4, 2025

(54) ELECTRONIC DEVICE AND METHOD FOR PERFORMING PERMISSION MANAGEMENT OF STORAGE DEVICE

(71) Applicant: PUFsecurity Corporation, Hsinchu County (TW)

(72) Inventors: Meng-Yi Wu, Hsinchu County (TW); Chia-Cho Wu, Hsinchu County (TW); Ching-Sung Yang, Hsinchu County (TW)

(73) Assignee: PUFsecurity Corporation, Hsinchu County (TW)

( * ) Notice: Subject to any disclaimer, the term of this patent is extended or adjusted under 35 U.S.C. 154(b) by 575 days.

(21) Appl. No.: 17/961,528

(22) Filed: Oct. 6, 2022

(65) Prior Publication Data
US 2023/0177173 A1 Jun. 8, 2023

Related U.S. Application Data

(60) Provisional application No. 63/286,083, filed on Dec. 5, 2021.

(51) Int. Cl.
*G06F 21/60* (2013.01)
*G06F 21/62* (2013.01)
*H04L 9/06* (2006.01)
*H04L 9/08* (2006.01)

(52) U.S. Cl.
CPC .......... *G06F 21/602* (2013.01); *G06F 21/604* (2013.01); *G06F 21/6218* (2013.01);
(Continued)

(58) Field of Classification Search
CPC ........ G06F 21/31; G06F 21/45; G06F 21/602; G06F 21/604; G06F 21/6209;
(Continued)

(56) References Cited

U.S. PATENT DOCUMENTS

| 2008/0010451 | A1* | 1/2008 | Holtzman | H04L 9/3273 |
| | | | | 713/158 |
| 2009/0059711 | A1* | 3/2009 | Oh | G11C 7/1075 |
| | | | | 365/230.05 |

(Continued)

FOREIGN PATENT DOCUMENTS

| CN | 111259350 A | 6/2020 |
| CN | 112163192 A | 1/2021 |

(Continued)

*Primary Examiner* — Theodore C Parsons
(74) *Attorney, Agent, or Firm* — Winston Hsu

(57) ABSTRACT

An electronic device and a method for performing permission management of a storage device are provided. The storage device includes multiple storage blocks. The electronic device includes a controller and multiple dedicated interfaces, wherein the multiple dedicated interfaces are coupled to multiple ports of the controller. The controller is configured to perform access control of the storage device. The multiple dedicated interfaces correspond to the multiple storage blocks, and each dedicated interface of the multiple dedicated interfaces is configured to provide a dedicated channel for accessing one of the multiple storage blocks corresponding to said each dedicated interface via the controller.

18 Claims, 8 Drawing Sheets

(52) U.S. Cl.
CPC .......... *H04L 9/0631* (2013.01); *H04L 9/0866* (2013.01); *H04L 9/0869* (2013.01); *G06F 2221/2141* (2013.01)

(58) Field of Classification Search
CPC ............. G06F 21/6218; G06F 21/6227; G06F 2221/2141; H04L 9/0631; H04L 9/0866; H04L 9/0869
See application file for complete search history.

(56) References Cited

U.S. PATENT DOCUMENTS

| | | |
|---|---|---|
| 2010/0299524 A1 | 11/2010 | Xia |
| 2011/0231632 A1 | 9/2011 | Kurosawa |
| 2012/0054832 A1 | 3/2012 | Ghosh |
| 2013/0051552 A1* | 2/2013 | Handschuh ........... H04L 9/0897 380/44 |
| 2013/0294602 A1* | 11/2013 | Huxham ............. H04L 63/0853 380/255 |
| 2020/0293467 A1 | 9/2020 | Ma |

FOREIGN PATENT DOCUMENTS

| | | |
|---|---|---|
| CN | 112560058 A | 3/2021 |
| JP | 2000-276406 A | 10/2000 |
| JP | 2006-11932 A | 1/2006 |
| JP | 2009-251999 A | 10/2009 |
| TW | 202027033 A | 7/2020 |

* cited by examiner

ELECTRONIC DEVICE AND METHOD FOR PERFORMING PERMISSION MANAGEMENT OF STORAGE DEVICE

CROSS REFERENCE TO RELATED APPLICATIONS

This application claims the benefit of U.S. Provisional Application No. 63/286,083, filed on Dec. 5, 2021. The content of the application is incorporated herein by reference.

BACKGROUND OF THE INVENTION

1. Field of the Invention

The present invention is related to permission management, and more particularly, to an electronic device and a method for performing permission management of a storage device.

2. Description of the Prior Art

A storage device supporting operations of an electronic system is partitioned into multiple storage spaces, where each of these storage spaces can be referred to as a container. Different containers can be arranged for different applications executed on the electronic system, respectively. In related arts, access operations of different containers are executed via a same interface. For example, access control regarding different containers can be managed by software. There is no specific hardware level portioning arranged for accessing different containers. In addition, if encryption and decryption operations are needed, it is typically to utilize one key for encrypting or decrypting data of different containers. Thus, it is hard to effectively manage access permissions of secure partitions and non-secure partitions within the storage device.

Thus, there is a need for a novel method and related architecture, in order to clearly partition access paths of different containers on the hardware level, thereby improving robustness of permission management of the storage device.

SUMMARY OF THE INVENTION

An objective of the present invention is to provide an electronic device and a method for performing permission management of a storage device, to solve the problem of the related art without introducing any side effect or in a way that is less likely to introduce side effects.

At least one embodiment of the present invention provides an electronic device for performing permission management of a storage device. The storage device may comprise multiple storage blocks. The electronic device may comprise a controller and multiple dedicated interfaces, wherein the multiple dedicated interfaces are coupled to multiple ports of the controller. The controller is configured to perform access control of the storage device. The multiple dedicated interfaces correspond to the multiple storage blocks, and each dedicated interface of the multiple dedicated interfaces is configured to provide a dedicated channel for accessing one of the multiple storage blocks corresponding to said each dedicated interface via the controller.

At least one embodiment of the present invention provides a method for performing permission management of a storage device. The storage device may comprise multiple storage blocks. The method may comprise: utilizing a first dedicated interface to provide a first dedicated channel for accessing a first storage block of the multiple storage blocks; utilizing a second dedicated interface to provide a second dedicated channel for accessing a second storage block of the multiple storage blocks; and utilizing a controller to prevent a host device coupled to the first dedicated interface from accessing the second storage block.

The embodiments of the present invention provides different hardware path such as the dedicated interfaces for accessing different containers such as the storage blocks. In addition, each of the dedicated interfaces can be assigned a unique key, in order to prevent a host device (e.g., a hacking apparatus) from accessing specific storage block via an interface which does not have the permission of accessing the specific storage block. Thus, the robustness of permission management of the storage device can be improved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
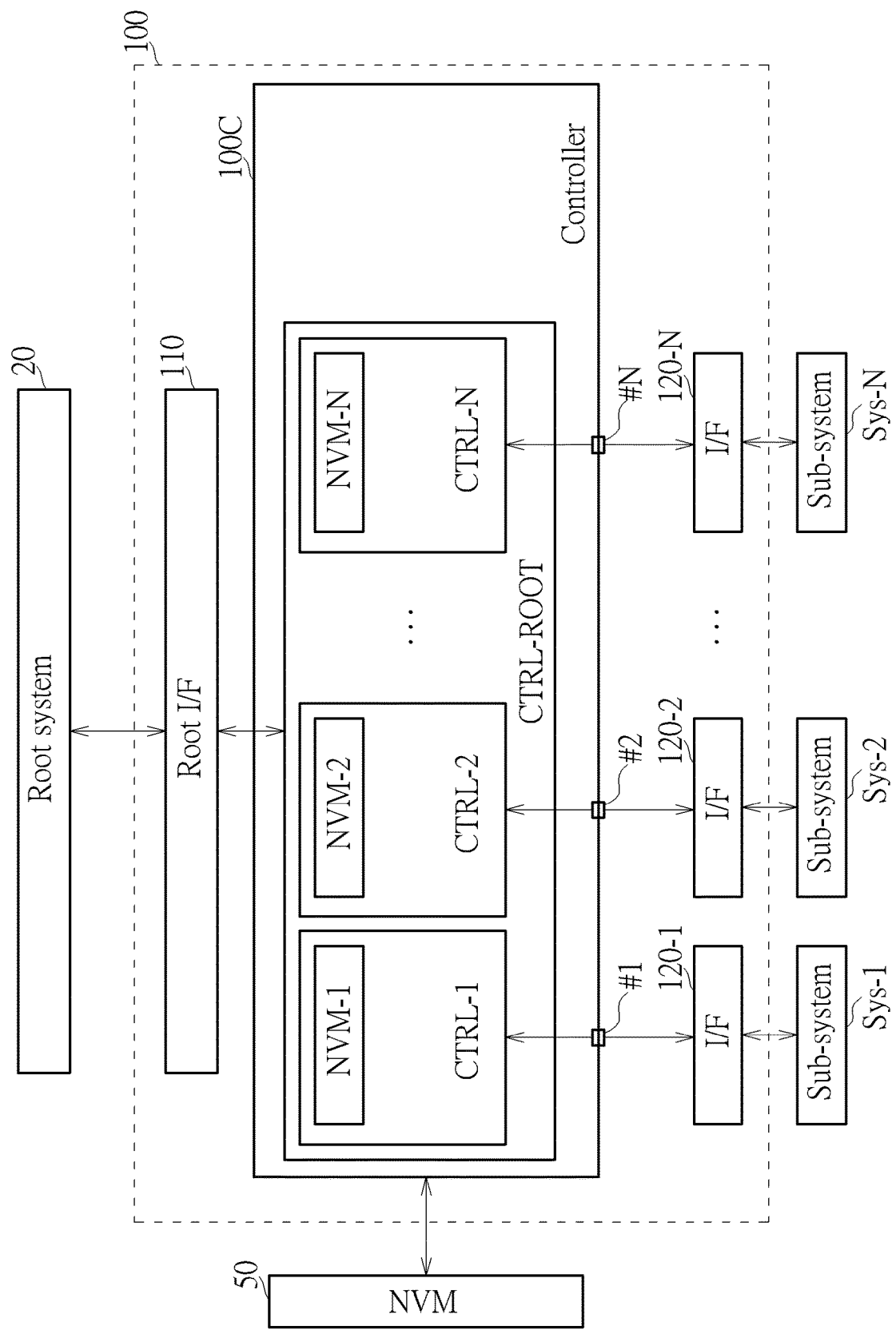
FIG. 1 is a diagram illustrating an electronic device according to an embodiment of the present invention.

FIG. 1 is a diagram illustrating an electronic device 100 according to an embodiment of the present invention, where the electronic device 100 is configured to perform related control for at least one host device such as sub-systems Sys-1, Sys-2, . . . and Sys-N to access a storage device such as a non-volatile memory (NVM) 50. Examples of the NVM 50 may include, but are not limited to: one-time programmable (OTP) memories, multi-time programmable (MTP) memories, electronic fuse (eFuse) memories, magnetoresistive random access memories (MRAMs) and resistive random-access memories (RRAMs).

As shown in FIG. 1, the electronic device 100 may comprise a controller 100C, dedicated interfaces 120-1, 120-2, . . . and 120-N (labeled "I/F" in figures for brevity) and a root interface 110 (labeled "Root I/F" in figures for brevity). The controller 100C is configured to perform access control of the NVM 50. The dedicated interfaces 120-1, 120-2, . . . and 120-N are coupled to multiple ports of the controller. For example, the multiple dedicated interfaces, the multiple ports of the controller, and the multiple storage blocks are corresponding to each other one by one. More particularly, the dedicated interface 120-1 is coupled to a port #1 of the controller 100C, the dedicated interface 120-2 is coupled to a port #2 of the controller 100C, and the rest can be deduced by analogy, for example, the dedicated interface 120-N is coupled to a port #N of the controller 100C. In this embodiment, the NVM 50 may comprise multiple storage blocks such as a first storage block, a second storage block, . . . and an $N^{th}$ storage block, where each of the multiple storage blocks can be referred to as a container for supporting a specific function. The dedicated interfaces 120-1, 120-2, . . . and 120-N may correspond to the multiple storage blocks, respectively, where each dedicated interface of the dedicated interfaces 120-1, 120-2, . . . and 120-N is configured to provide a dedicated channel for accessing a corresponding storage block of said each dedicated interface via the controller 100C. More particularly, the dedicated interface 120-1 is configured to provide a first dedicated channel for accessing the first storage block, the dedicated interface 120-2 is configured to provide a second dedicated channel for accessing the second storage block, and the rest can be deduced by analogy, for example, the dedicated interface 120-N is configured to provide an $N^{th}$ dedicated channel for accessing the $N^{th}$ storage block. To be noticed, in other embodiments, the number of the dedicated interfaces 120-1, 120-2, . . . and 120-N can be different from the number of the multiple storage blocks, in other words, the dedicated interfaces and the multiple storage blocks are not limited to be coupled to each other one by one.

According to above configuration, the controller 100C can prevent a host device coupled to a certain dedicated interface from accessing storage blocks other than the storage block corresponding to the dedicated interface. More particularly, the sub-system Sys-1 is able to access the first storage block only, where the controller 100C may prevent the sub-system Sys-1 from accessing any storage block other than the first storage block. The rest can be deduced by analogy, for example, the sub-system Sys-N is able to access the $N^{th}$ storage block only, where the controller 100C may prevent the sub-system Sys-N from accessing any storage block other than the $N^{th}$ storage block.

In this embodiment, the controller 100C may perform control operation (e.g., address mapping, data mapping, or encryption/decryption operations) on the corresponding storage block which receives an access command via the corresponding port. The access command may include data and/or address information. More particularly, when the sub-system Sys-1 coupled to the dedicated interface 120-1 sends an access command to the electronic device 100, the controller 100C may receive this access command via the port #1, thereby performing a control operation CTRL-1 to generate an mapping result and/or corresponding data for the first storage block (labeled "NVM-1" for better comprehension). The rest can be deduced by analogy, for example, when the sub-system Sys-N coupled to the dedicated interface 120-N sends an access command to the electronic device 100, the controller 100C may receive this access command via the port #N, thereby performing a control operation CTRL-N to generate a mapping result and/or corresponding data for the $N^{th}$ storage block (labeled "NVM-N" for better comprehension). In one embodiment, the mapping result can be generated by scrambling/unscrambling the data or the address related to the access command according to the HUKs HUK-1, HUK-2, . . . and HUK-N, which will be described in detail later.

In this embodiment, the root interface 110 is coupled between the controller 100C and a root system 20, where the root interface 110 is configured to provide root channel which is capable of accessing all of the storage blocks of the NVM 50 via the controller 100C. For example, a host device including the root system 20 may send a root command to the controller 100C via the root interface 110. As the controller 100C recognizes that the root command is received, the controller 100C may authorize the highest permission for accessing the NVM 50 and thereby perform a root control operation CTRL-ROOT according to the root command. After the root control operation CTRL-ROOT is completed, part of or all of the root interface 110 may be temporarily or permanently disabled. The root control operation CTRL-ROOT may include quality check of the NVM 50, transmitting an entropy seed to the controller 100C, or setting secure flags of the multiple storage blocks of the NVM 50, etc. In one embodiment, when the electronic device 100 is secured enough, only partial function(s) (e.g., a test mode) of the root interface 110 corresponding to one or more storage block(s) are disabled, and other functions keep enabled. In another embodiment, after the quality check is performed on each of the storage blocks of the NVM 50, one or more storage blocks which failed the quality check may not be accessed via the root interface, in other words, the part of the root interface corresponding to the one or more storage blocks which failed the quality check may be temporarily or permanently disabled.

In some embodiments, permission of accessing any storage block of the multiple storage blocks within the NVM 50 may be determined by whether a secure flag corresponding to the storage block is set or not. For example, the root system 20 may send a root command via the root interface 110 for setting a secure flag of any storage block of the first storage block, the second storage block, . . . and the $N^{th}$ storage block, in order to temporarily or permanently disable the storage block. In some embodiments, when any storage block (e.g., an $M^{th}$ storage block, where M may be a positive integer not greater than N) of the first storage block, the second storage block, . . . and the $N^{th}$ storage block is full or the writing operation is completed, the controller 100C may set a secure flag of the $M^{th}$ storage block, in order to set the $M^{th}$ storage block to be a read only storage block.

Figure 2:
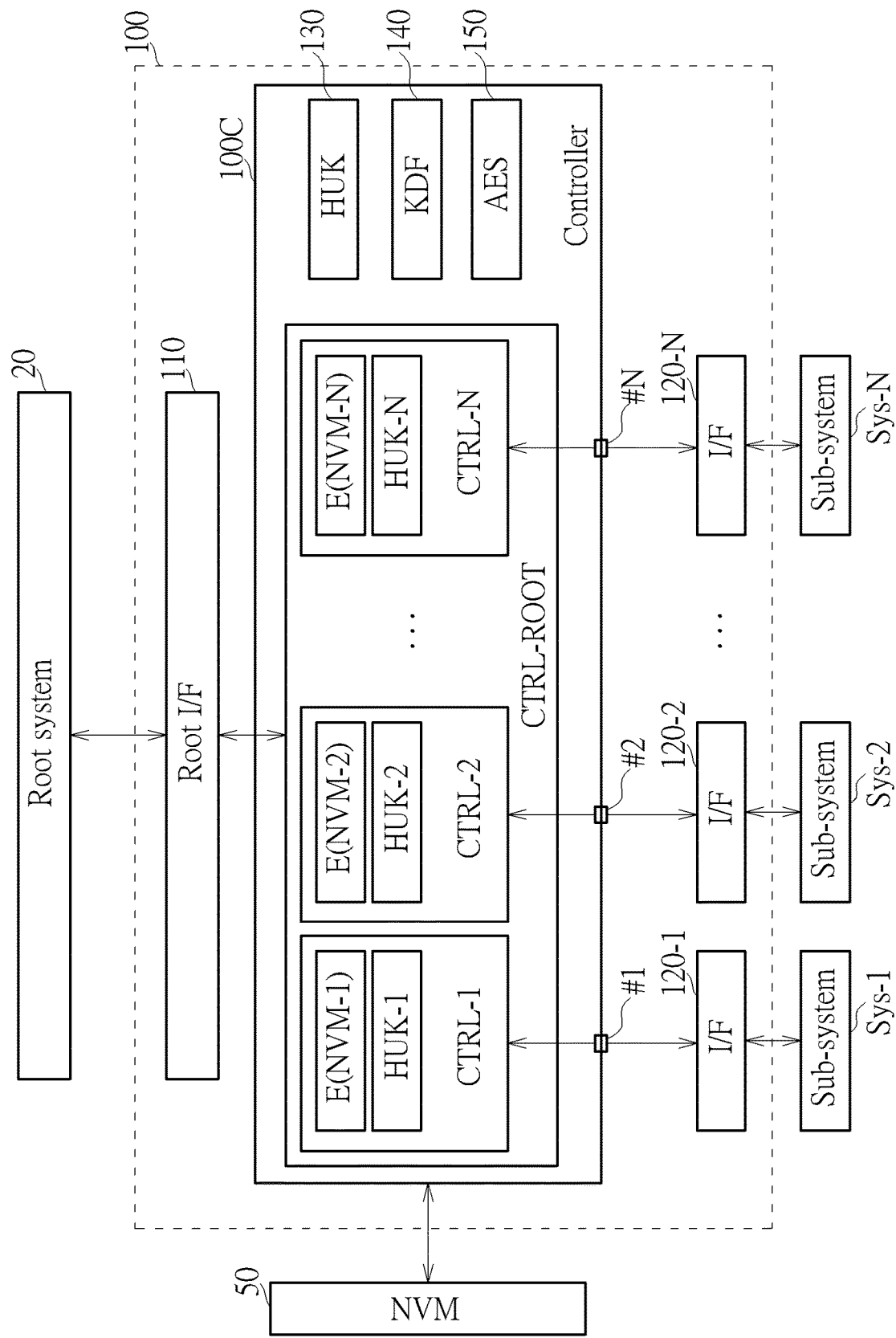
FIG. 2 is a diagram illustrating some details of the electronic device shown in FIG. 1 according to an embodiment of the present invention.

FIG. 2 is a diagram illustrating some details of the electronic device 100 according to an embodiment of the present invention. The controller 100C may further comprise at least one OTP memory for storing an entropy seed such as a hardware unique key (HUK) 130. In addition, the controller 100C may further comprise a key derivation function (KDF) circuit such as a KDF engine 140 and an encryption/decryption circuit such as an advanced encryption standard (AES) engine 150. In this embodiment, the controller 100C may utilize the KDF engine 140 to generate multiple HUKs such as HUK-1, HUK-2, . . . and HUK-N according to the entropy seed such as the HUK 130 of the controller 100C, and assign the HUKs HUK-1, HUK-2, . . . and HUK-N to the dedicated interfaces 120-1, 120-2, . . . and 120-N, respectively, where the HUKs HUK-1, HUK-2, . . . and HUK-N are different from one another. More particularly, the controller 100C may assign the HUK HUK-1 to the dedicated channel of the dedicated interface 120-1, assign the HUK HUK-2 to the dedicated channel of the dedicated interface 120-2, and the reset can be deduced by analogy, for example, assign the HUK HUK-N to the dedicated channel of the dedicated interface 120-N. For each dedicated interface, the controller 100C may utilize a HUK assigned to said each dedicated interface to control access of the corresponding storage block. More particularly, when the sub-system Sys-1 sends an access command to the electronic device 100, the controller 100C may receive this access command via the port #1, thereby performing the control operation CTRL-1 according to the HUK HUK-1, wherein the AES engine 150 may utilize the HUK HUK-1 to encrypt data from the dedicated interface 120-1, for generating encrypted data E(NVM-1) (e.g., the mapping result) to be written into the first storage block. The rest can be deduced by analogy, for example, when the sub-system Sys-N sends an access command to the electronic device 100, the controller 100C may receive this access command via the port #N, thereby performing the control operation CTRL-N according to the HUK HUK-N, wherein the AES engine 150 may utilize the HUK HUK-N to encrypt data from the dedicated interface 120-N, for generating encrypted data E(NVM-N) to be written into the first storage block.

It should be noted that the embodiment of FIG. 2 takes the AES engine as an example of the encryption/decryption circuit, which encrypt data by adopting AES algorithm such as XTS, Cipher Block Chaining (CBC) or Electronic Code Book (EBC), etc., but the present invention is not limited thereto. In some embodiments, the encryption/decryption circuit encrypts the data from said each dedicated interface by adopting Data Encryption Standard (DES) algorithm, proprietary algorithm, block cipher algorithm or other encryption/decryption algorithm. In some embodiments, the encryption/decryption circuit may comprise at least one exclusive-OR (XOR) logic circuit, and the at least one XOR logic circuit is configured to perform XOR logic operation on the HUK assigned to said each dedicated interface and the data from said each dedicated interface, for generating the encrypted data. As long as encryption/decryption circuit can scramble the data or address received by said each dedicated interface with the aid of the assigned HUK, the adopted algorithm or standard may vary.

Figure 3:
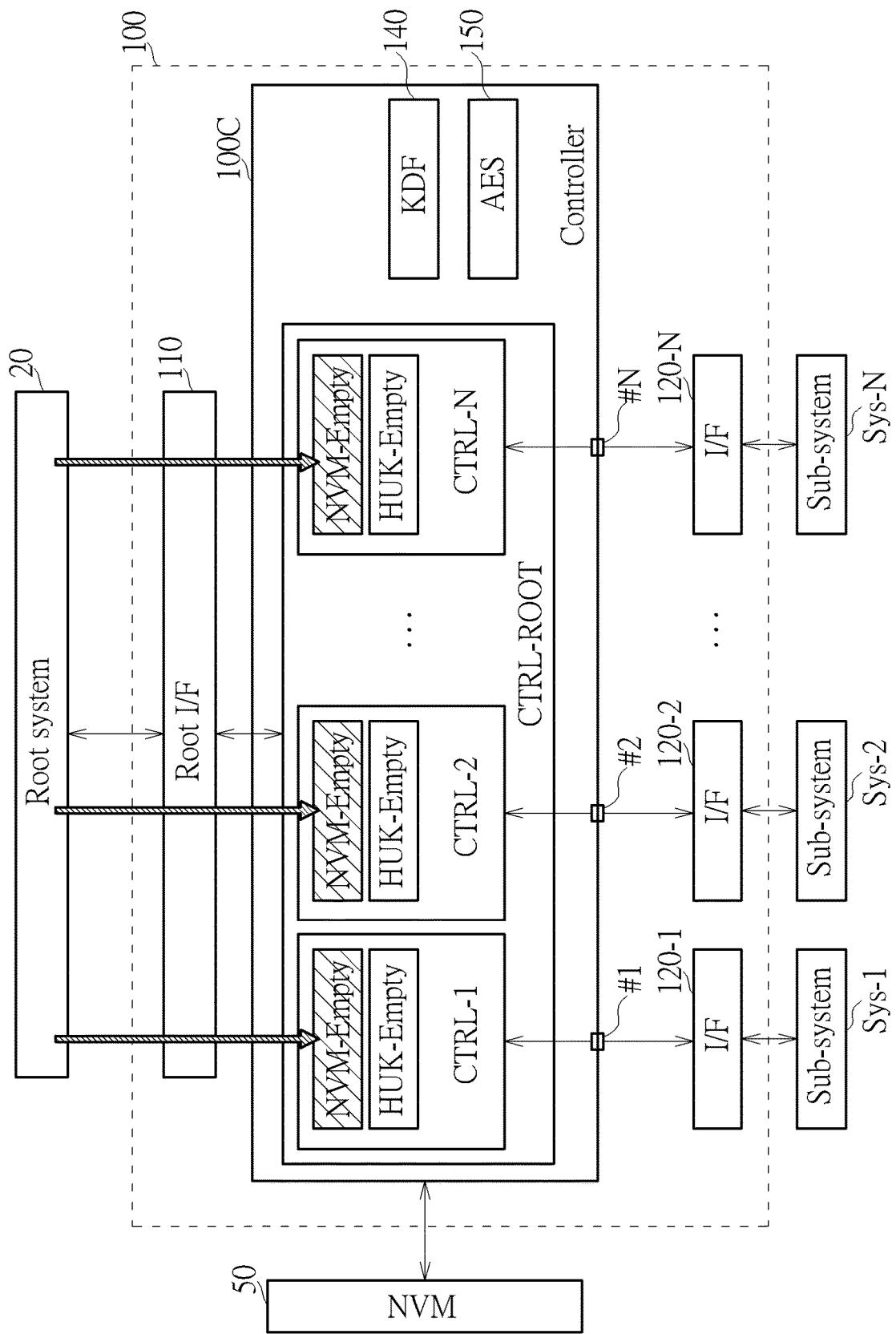
FIG. 3 is a diagram illustrating some root control of the electronic device shown in FIG. 2 via a root interface according to an embodiment of the present invention.

FIG. 3 is a diagram illustrating some root controls of the electronic device 100 via the root interface 110 according to an embodiment of the present invention. For example, during a chip probe or final test (CP/FT) phase of a manufacturing process of the electronic device 100 and/or the NVM 50, the root system 20 may perform quality check and/or setting of secure flags via the root interface 110. As shown in FIG. 3, the entropy seed is not written into the controller 100C (e.g., the OTP memory thereof) yet, and the registers storing the assigned HUKs of respective dedicated interfaces are still empty, labeled "HUK-Empty" in FIG. 3 for better comprehension. In addition, there is no data being written or stored in the NVM 50 during the CP/FT phase, labeled "NVM-Empty" in FIG. 3 for better comprehension.

Figure 4:
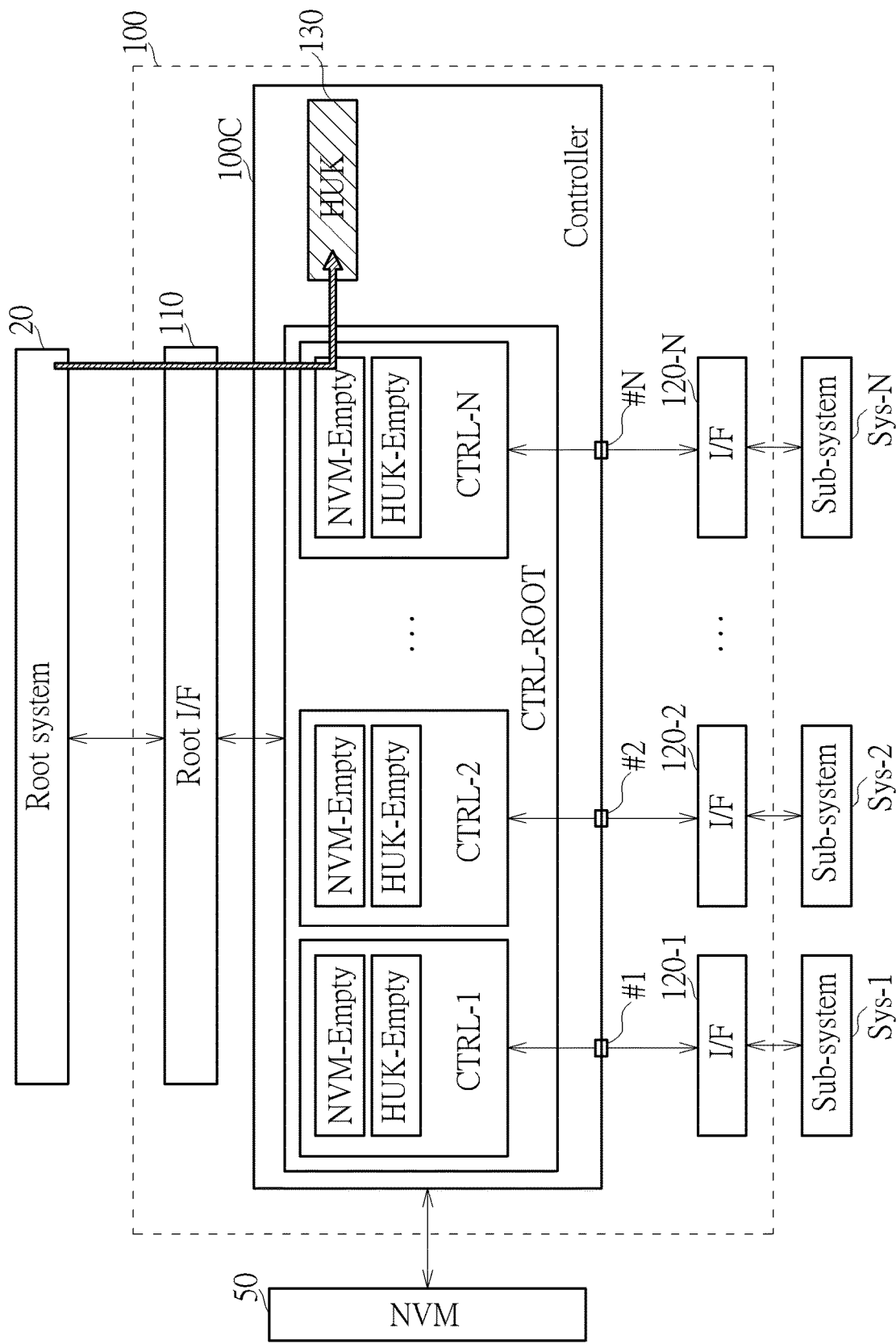
FIG. 4 is a diagram illustrating an operation of transmitting an entropy seed to a controller according to an embodiment of the present invention.
Figure 5:
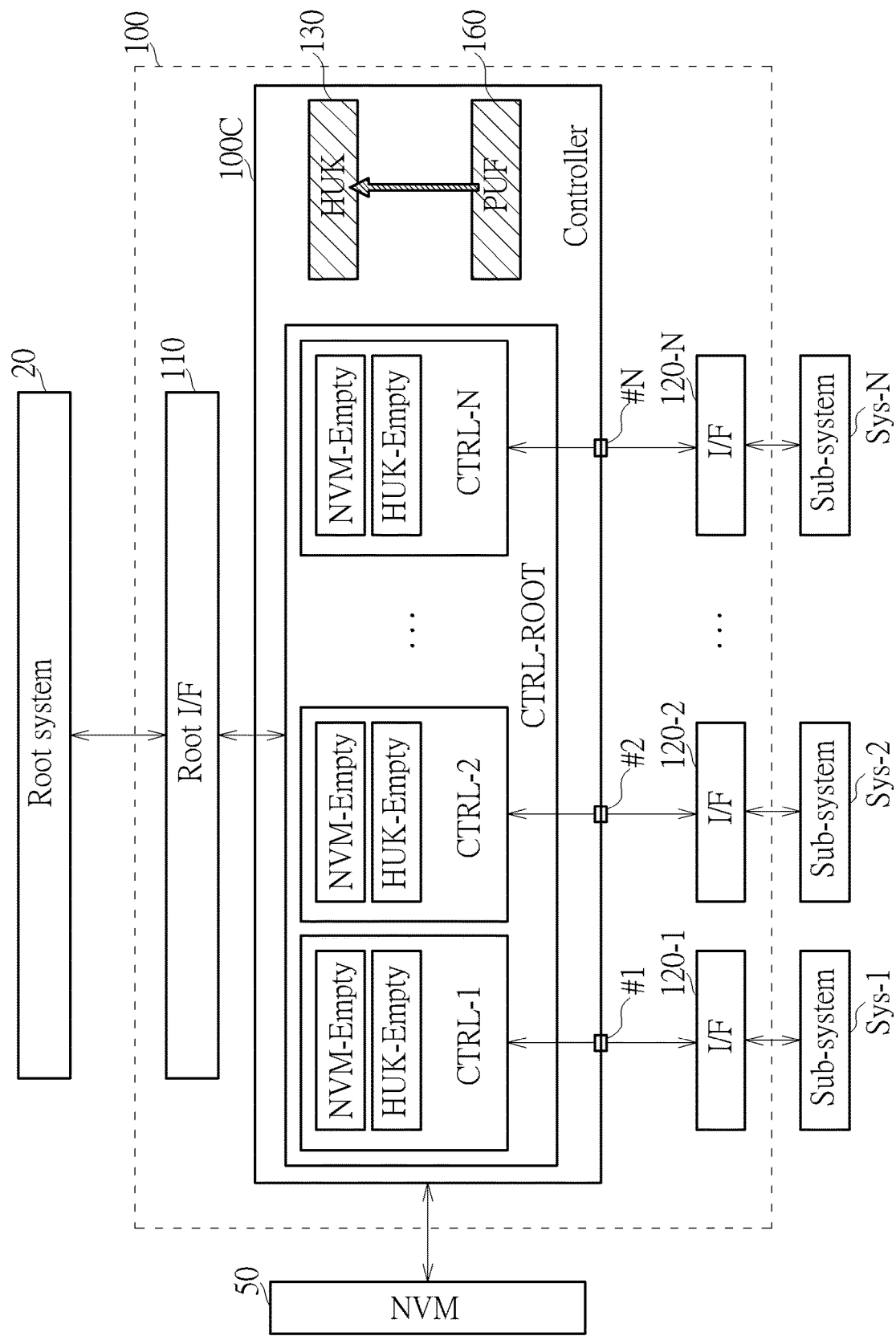
FIG. 5 is a diagram illustrating an operation of utilizing a built-in device to self-generate an entropy seed according to an embodiment of the present invention.

FIG. 4 is a diagram illustrating an operation of transmitting an entropy seed such as the HUK 130 to the controller 100C (e.g., the OTP memory thereof) according to an embodiment of the present invention. As shown in FIG. 4, the root system may transmit the HUK 130 to the controller 100C from outside of the controller 100C. However, the HUK 130 is not limited to be derived from outside of the controller 100C. FIG. 5 is a diagram illustrating an operation of utilizing a built-in device to self-generate the HUK 130 according to an embodiment of the present invention. As shown in FIG. 5, the controller 100C may further comprise a physical unclonable function (PUF) device 160, wherein the PUF device 160 is configured to generate the HUK 130 of the controller 100C.

Figure 6:
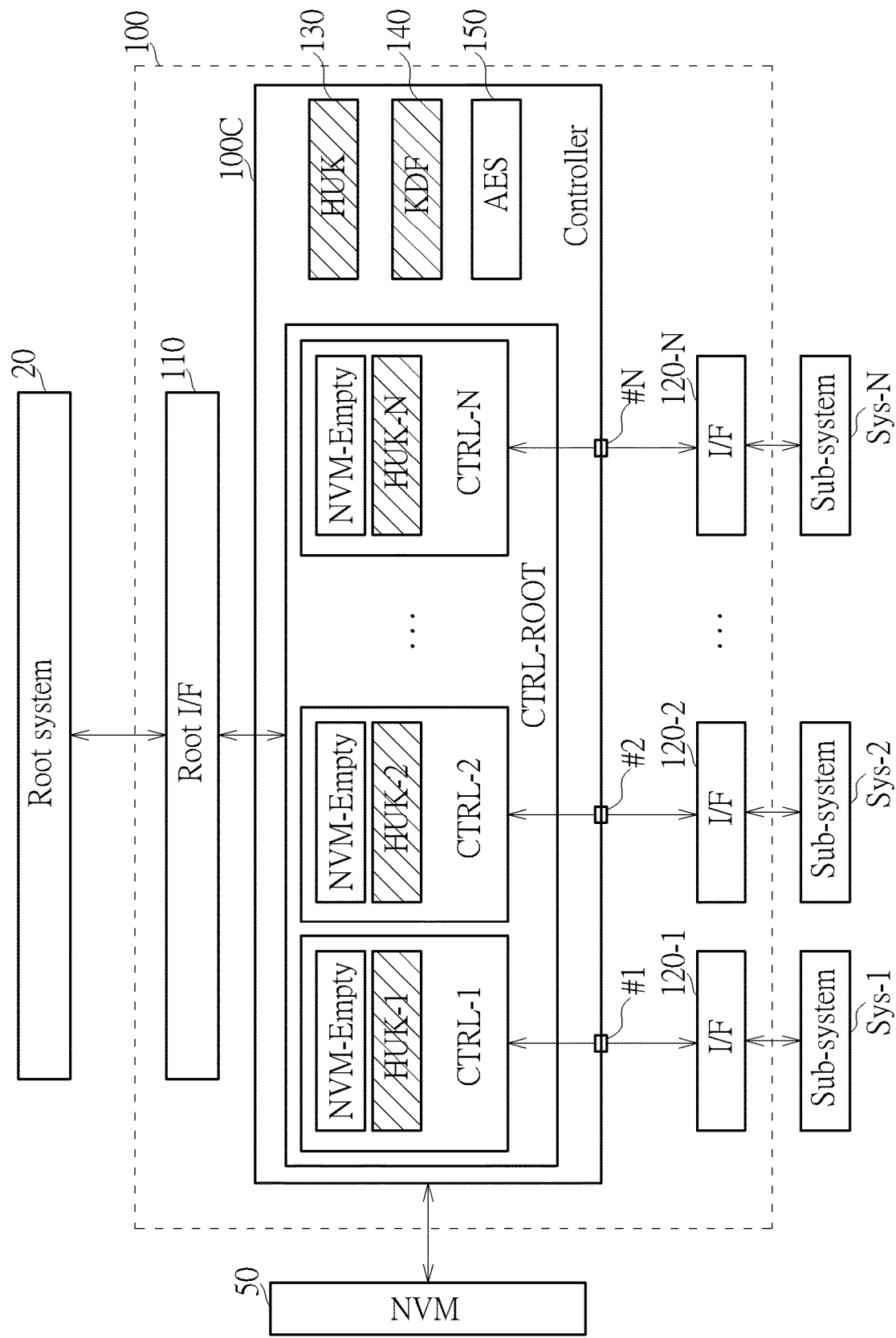
FIG. 6 is a diagram illustrating an operation of assigning hardware unique keys according to an embodiment of the present invention.

FIG. 6 is a diagram illustrating an operation of assigning the HUKs HUK-1, HUK-2, . . . and HUK-N according to an embodiment of the present invention. As shown in FIG. 6, after the HUK 130 is ready, the controller 100C may utilize the KDF engine 140 to generate multiple different HUK such as the HUKs HUK-1, HUK-2, . . . and HUK-N according to an embodiment of the present invention, and the controller 100C may assign the HUKs HUK-1, HUK-2, . . . and HUK-N to the dedicated channels provided by the dedicated interfaces 120-1, 120-2, . . . and 120-N, respectively. In detail, the operation of assigning the HUKs HUK-1, HUK-2, . . . and HUK-N may be performed when the electronic device 100 is powered on. For example, when the electronic device is powered off, the HUKs HUK-1, HUK-2, . . . and HUK-N stored in registers may vanish; and the HUKs HUK-1, HUK-2, . . . and HUK-N can be re-loaded to the registers during the next power on, but the present invention is not limited thereto.

Figure 7:
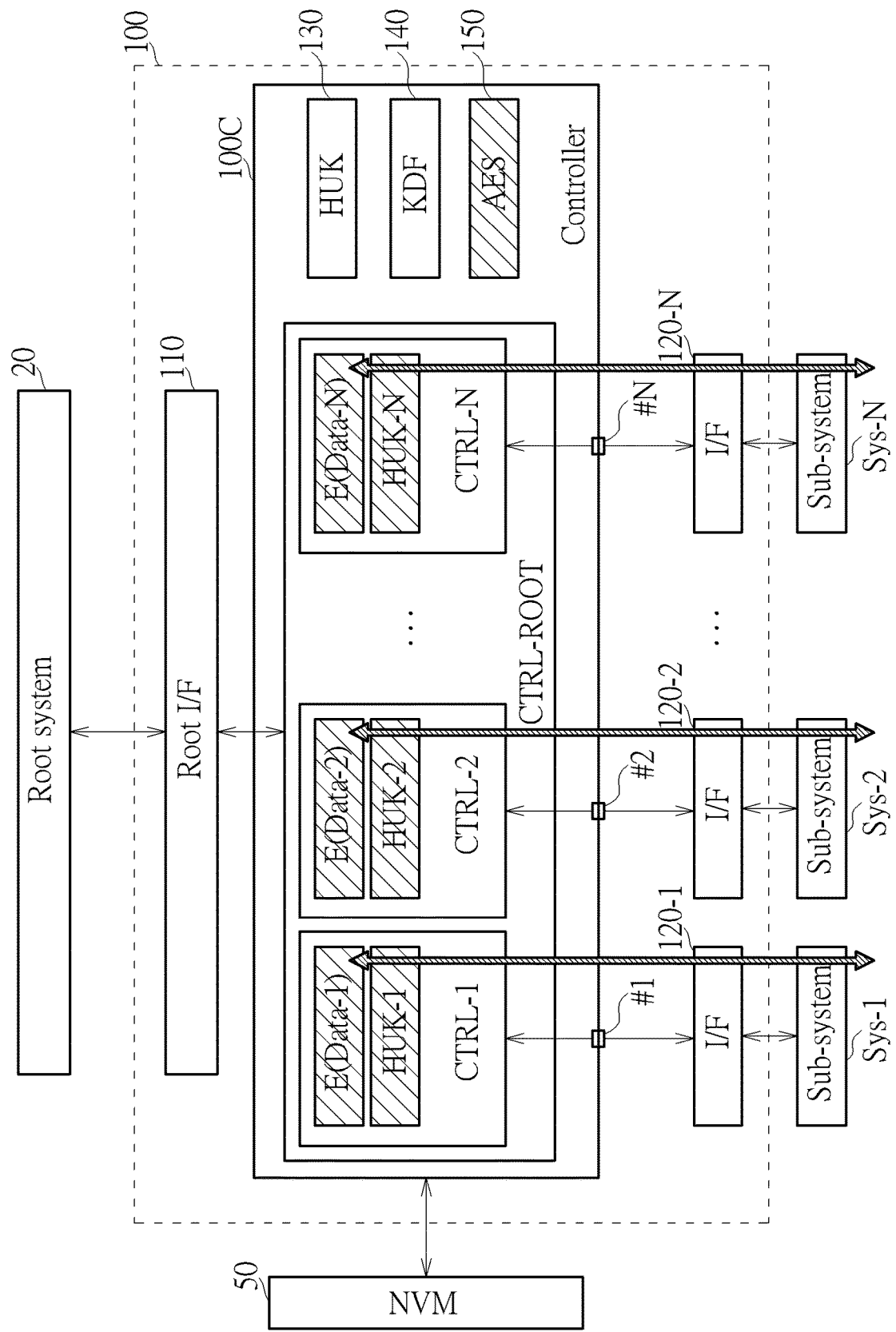
FIG. 7 is a diagram illustrating data access of a storage device via the electronic device shown in FIG. 2 according to an embodiment of the present invention.

FIG. 7 is a diagram illustrating data access of the NVM 50 via the electronic device 100 according to an embodiment of the present invention. As shown in FIG. 7, when the sub-system Sys-1 sends an access command in order to write data Data-1 into the first storage block of the NVM 50, the AES engine 150 may encrypt the data Data-1 according to the HUK HUK-1 to generate encrypted data E(Data-1) to be written into the first storage block. The rest can be deduced by analogy, for example, when the sub-system Sys-N sends an access command in order to write data Data-N into the $N^{th}$ storage block of the NVM 50, the AES engine 150 may encrypt the data Data-N according to the HUK HUK-N to generate encrypted data E(Data-N) to be written into the $N^{th}$ storage block.

In addition, when the sub-system Sys-1 sends an access command in order to read the data Data-1 stored in the first storage block, the controller 100C may derive the encrypted data E(Data-1) from the first storage block first, and the AES 150 may decrypt the encrypted data E(Data-1) according to the HUK HUK-1, in order to respond the data Data-1 to the sub-system Sys-1. The rest can be deduced by analogy, for example, when the sub-system Sys-N sends an access command in order to read the data Data-N stored in the $N^{th}$ storage block, the controller 100C may derive the encrypted data E(Data-N) from the $N^{th}$ storage block first, and the AES 150 may decrypt the encrypted data E(Data-N) according to the HUK HUK-N, in order to respond the data Data-N to the sub-system Sys-N.

In some embodiments, the operations described above performed through each of the dedicated interfaces 120-1~120-N can be alternatively performed through the root interface 110, which is available to access part of the N storage blocks NVM-1~NVM-N even after the root control operation CTRL-ROOT is completed.

Based on the configuration of the present invention, even if a hacker adopts certain illegal manner, in order to make an target location of an access command sent to the dedicated interface 120-1 jump to an address of a storage block other than the first storage block, e.g., the second storage block, the hacker is still unable to attack the right location which he attempts to attack, as different storage blocks may have different address mapping. In addition, even if the hacker illegally derived the encrypted data E(Data-2) via the dedicated interface 120-1, the hacker is still unable to correctly decrypt the encrypted data E(Data-2), as the access operation performed on the dedicated interface 120-1 does not have the permission to derive the HUK HUK-2. Thus, in comparison with the related art which merely implement the permission management in software level, the robustness of security related management can be effectively improved.

Figure 8:
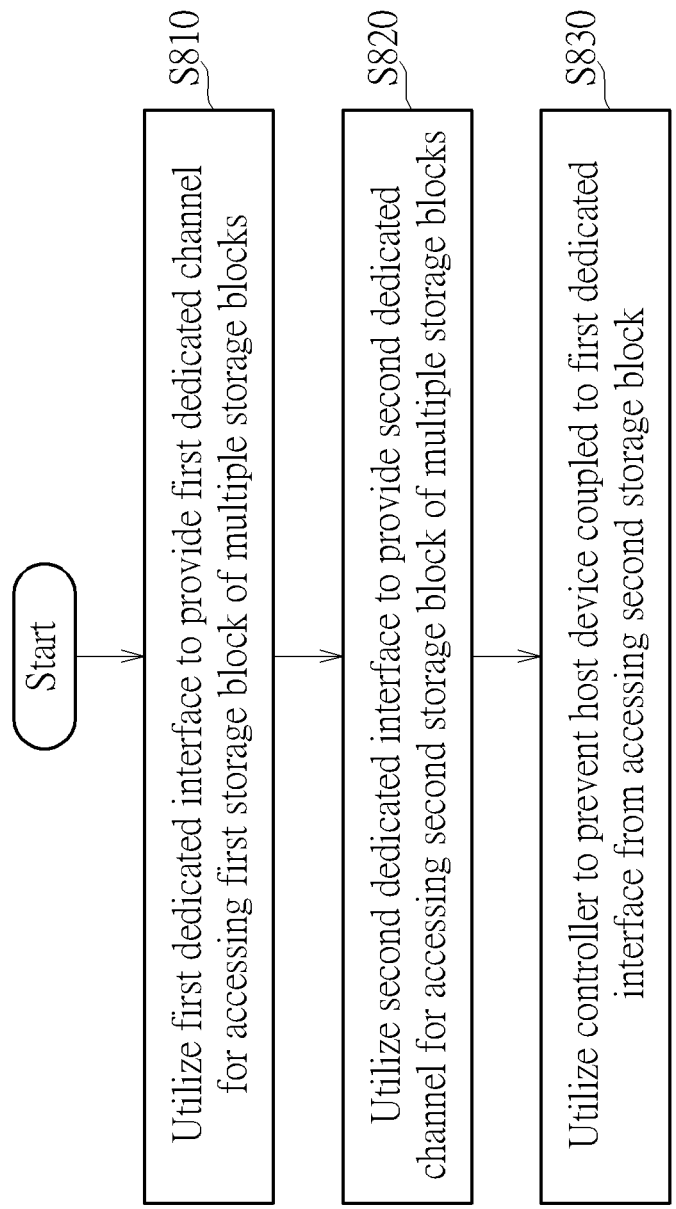
FIG. 8 is a diagram illustrating a working flow of a method for performing permission management of a storage device according to an embodiment of the present invention.

FIG. 8 is a diagram illustrating a working flow of a method for performing permission management of a storage device according to an embodiment of the present invention, where the storage device comprises multiple storage blocks, and the working flow is applicable to the electronic device 100. It should be noted that one or more steps may be added, deleted or modified in the working flow shown in FIG. 8, and these steps do not have to be executed in the exact order shown in FIG. 8 if a same result can be obtained.

In Step S810, the electronic device 100 may utilize a first dedicated interface (e.g., the dedicated interface 120-1) to provide a first dedicated channel for accessing a first storage block of the multiple storage blocks.

In Step S820, the electronic device 100 may utilize a second dedicated interface (e.g., any dedicated interface other than the first dedicated interface 120-1) to provide a second dedicated channel for accessing a second storage block of the multiple storage blocks.

In Step S830, the electronic device 100 may utilize a controller (e.g., the controller 100C) to prevent a host device (e.g., the sub-system Sys-1) coupled to the first dedicated interface from accessing the second storage block (e.g., any storage block other than the first storage block).

To summarize, the embodiments of the present invention provides dedicated interface respectively for different containers of a storage device, which makes the permission management can be handled in hardware level. With this configuration, respective secure flags can be set for more flexible management for different containers. Thus, different containers within the storage device can have different permission levels, different dedicated interfaces, different control operations, different storage spaces and different address mapping. Thus, the robustness of the permission management can be greatly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device for performing permission management of a storage device, the storage device comprising multiple storage blocks, the electronic device comprising:
    a controller, configured to perform access control of the storage device; and
    multiple dedicated interfaces, coupled to multiple ports of the controller, wherein the multiple dedicated interfaces correspond to the multiple storage blocks, each dedicated interface of the multiple dedicated interfaces is configured to provide a dedicated channel for accessing one of the multiple storage blocks corresponding to said each dedicated interface via the controller, the multiple dedicated interfaces and the multiple storage blocks are corresponding to each other one by one, and, different storage blocks of the multiple storage blocks have different address mapping;
    wherein the controller assigns multiple hardware unique keys (HUKs) to the multiple dedicated interfaces, respectively, different HUKs of the multiple HUKs are assigned to different dedicated interfaces of the multiple dedicated interfaces, and the controller utilizes a HUK assigned to a first dedicated interface of the multiple dedicated interfaces to control access of a first storage block of the multiple storage blocks corresponding to the first dedicated interface.

2. The electronic device of claim 1, further comprising:
    a root interface, coupled to the controller, configured to provide a root channel for accessing all of the multiple storage blocks via the controller.

3. The electronic device of claim 2, wherein a host device coupled to the root interface performs quality check of the storage device, and after the quality check is completed, at least a part of the root interface is temporarily or permanently disabled.

4. The electronic device of claim 2, wherein a host device coupled to the root interface transmits an entropy seed to the controller, and after transmission of the entropy seed is completed, at least a part of the root interface is temporarily or permanently disabled.

5. The electronic device of claim 2, wherein a host device coupled to the root interface sets secure flags of the multiple storage blocks, and after setting of the secure flags is completed, at least a part of the root interface is temporarily or permanently disabled.

6. The electronic device of claim 5, wherein permission of accessing any storage block of the multiple storage blocks is determined by whether the secure flag corresponding to each of the storage blocks is set or not.

7. The electronic device of claim 1, wherein the controller comprises:
    a key derivation function (KDF) circuit, configured to generate the multiple HUKs according to an entropy seed of the controller.

8. The electronic device of claim 7, wherein the entropy seed of the controller is transmitted from outside of the controller.

9. The electronic device of claim 1, wherein the controller performs mapping on the first storage block according to the HUK assigned to the first dedicated interface and an access command received via the first dedicated interface.

10. The electronic device of claim 1, wherein the controller comprises:
    an encryption circuit, configured to utilize the HUK assigned to said each dedicated interface to encrypt data from said each dedicated interface, for generating encrypted data;
    wherein the controller stores the encrypted data in the storage block corresponding to said each dedicated interface.

11. The electronic device of claim 10, wherein the encryption circuit comprises at least one exclusive-OR (XOR) logic circuit, and the at least one XOR logic circuit is configured to perform at least one XOR logic operation on the HUK assigned to said each dedicated interface and the data from said each dedicated interface, for generating the encrypted data.

12. The electronic device of claim 10, wherein the encryption circuit encrypts the data from said each dedicated interface by adopting Advanced Encryption Standard (AES) algorithm.

13. The electronic device of claim 10, wherein the encryption circuit encrypts the data from said each dedicated interface by adopting Data Encryption Standard (DES) algorithm.

14. A method for performing permission management of a storage device, the storage device comprising multiple storage blocks, the method comprising:

utilizing a first dedicated interface of multiple dedicated interfaces to provide a first dedicated channel for accessing a first storage block of the multiple storage blocks;

utilizing a second dedicated interface of the multiple dedicated interfaces to provide a second dedicated channel for accessing a second storage block of the multiple storage blocks, wherein the multiple dedicated interfaces and the multiple storage blocks are corresponding to each other one by one, and different storage blocks of the multiple storage blocks have different address mapping; and utilizing a controller to prevent a host device coupled to the first dedicated interface from accessing the second storage block;

wherein the controller assigns multiple hardware unique keys (HUKs) to the multiple dedicated interfaces, respectively, different HUKs of the multiple HUKs are assigned to different dedicated interfaces of the multiple dedicated interfaces, and the controller utilizes a HUK assigned to the first dedicated interface of the multiple dedicated interfaces to control access of the first storage block of the multiple storage blocks corresponding to the first dedicated interface.

15. The method of claim 14, wherein utilizing the controller to prevent the host device coupled to the first dedicated interface from accessing the second storage block comprising:

assigning a first hardware unique key (HUK) and a second HUK to the first dedicated interface and the second dedicated interface, respectively; and utilizing the first HUK and the second HUK for controlling access of the first storage block and the second storage block, respectively;

wherein the first HUK is different from the second HUK.

16. The method of claim 15, wherein the first HUK and the second HUK are generated according to an entropy seed of the controller by a key derivation function (KDF) circuit.

17. The method of claim 16, further comprising:

transmitting the entropy seed to the controller from outside of the controller via a root interface coupled to the controller;

wherein after transmission of the entropy seed is completed, the root interface is temporarily or permanently disabled.

18. The method of claim 16, further comprising:

generating the entropy seed by a physical unclonable function (PUF) device built in the controller.

* * * * *